US008020826B2

(12) United States Patent
Zhou

(10) Patent No.: US 8,020,826 B2
(45) Date of Patent: Sep. 20, 2011

(54) ROTATABLE MODULE AND SUPPORTING MECHANISM USING THE SAME

(75) Inventor: Fan Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 347 days.

(21) Appl. No.: 12/344,675

(22) Filed: Dec. 29, 2008

(65) Prior Publication Data
US 2010/0059637 A1 Mar. 11, 2010

(30) Foreign Application Priority Data

Sep. 10, 2008 (CN) .......................... 2008 1 0304434

(51) Int. Cl.
*A47H 1/00* (2006.01)
(52) U.S. Cl. .......................... 248/317; 248/917; 248/923
(58) Field of Classification Search .................. 248/917, 248/371, 372.1, 176.1, 276.1; 16/54, 68, 16/342, 337, 681; 361/679.27, 679.02
See application file for complete search history.

(56) References Cited

U.S. PATENT DOCUMENTS

| 6,125,507 A * | 10/2000 | Katoh .............................. 16/329 |
| 6,539,582 B1* | 4/2003 | Chae ............................... 16/340 |
| 6,918,159 B2* | 7/2005 | Choi ............................... 16/347 |
| 7,753,331 B2* | 7/2010 | Tang et al. ................. 248/284.1 |
| 2003/0122046 A1* | 7/2003 | Huong ........................ 248/291.1 |
| 2007/0136995 A1* | 6/2007 | Hu et al. ......................... 16/340 |
| 2008/0192417 A1* | 8/2008 | Hwang et al. ................. 361/681 |
| 2009/0147458 A1* | 6/2009 | Wang et al. ............. 361/679.27 |

* cited by examiner

*Primary Examiner* — Amy J Sterling
(74) *Attorney, Agent, or Firm* — Altis Law Group, Inc.

(57) ABSTRACT

A rotatable module includes a pivotal shaft, a rotating washer, a stationary washer, a resilient member, and a fixing member. The rotating washer is rotatably sleeved on the pivotal shaft. The stationary washer is non-rotatably sleeved on the pivotal shaft. The fixing member prevents the above mentioned components from detaching from each other. The rotating washer and the stationary washer have an engaging surface and a resisting surface respectively. The engaging surface resists the resisting surface due to a force of the resilient member. The engaging surface forms a plurality of protrusions, and the resisting surface defines a plurality of grooves to engage with the protrusions. The resisting surface further defines at least one buffering portion adjacent to at least one of the grooves or in at least one of the grooves to receive material flowing from other portions adjacent to the at least one of groove.

10 Claims, 5 Drawing Sheets

ROTATABLE MODULE AND SUPPORTING MECHANISM USING THE SAME

BACKGROUND

1. Technical Field

The present disclosure relates to a rotatable module and a supporting mechanism using the same, and particularly to a supporting mechanism employed in an electronic device, such as a liquid crystal display.

2. Description of the Related Art

A liquid crystal display (LCD) device is prevalent in society. An important feature of the LCD is its flexibility to be oriented in various orientations. The LCD is usually rotatable via a rotatable module. A typical rotatable module includes a supporting member, a connecting member, a pivotal shaft, a frame, a rotating washer, a stationary washer, and a resilient member. The connecting member connects the supporting member. The LCD is fixed on the frame and the frame is fixed on the connecting member. The rotating washer defines a plurality of depressions, and the stationary washer forms a plurality of protrusions to engage with the depressions. The pivotal shaft includes a shaft portion and a connecting portion connecting with the shaft portion. The connecting member is non-rotatably connected with the connecting portion. The stationary washer is non-rotatably fixed on the shaft portion, and the rotating washer is rotatably sleeved on the shaft portion in such a manner that the protrusions of the rotating washer face the grooves of the stationary washer. The resilient member provides an axial force so that the protrusions of the rotating washer are inserted into the grooves of the stationary washer, thereby allowing movement of the frame relative to the supporting member when a moderate force is applied, and also allows the frame to be stably maintained in a desired position relative to the supporting member.

However, the grooves of the stationary washer are formed by a punching process. A groove with a relatively large depth typically has metallic material flowing to portions of the washer adjacent to the groove during forming. As a result, a dimension of the stationary washer changes, making it difficult for the protrusions to engage in the grooves. But, if a depth of the grooves is relatively small, the frictional force between the stationary washer and the rotating stationary washer is also small, and the protrusions easily slide out of the grooves, resulting in a poor mechanical reliability.

Therefore, a new rotatable module and a supporting mechanism using the same is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
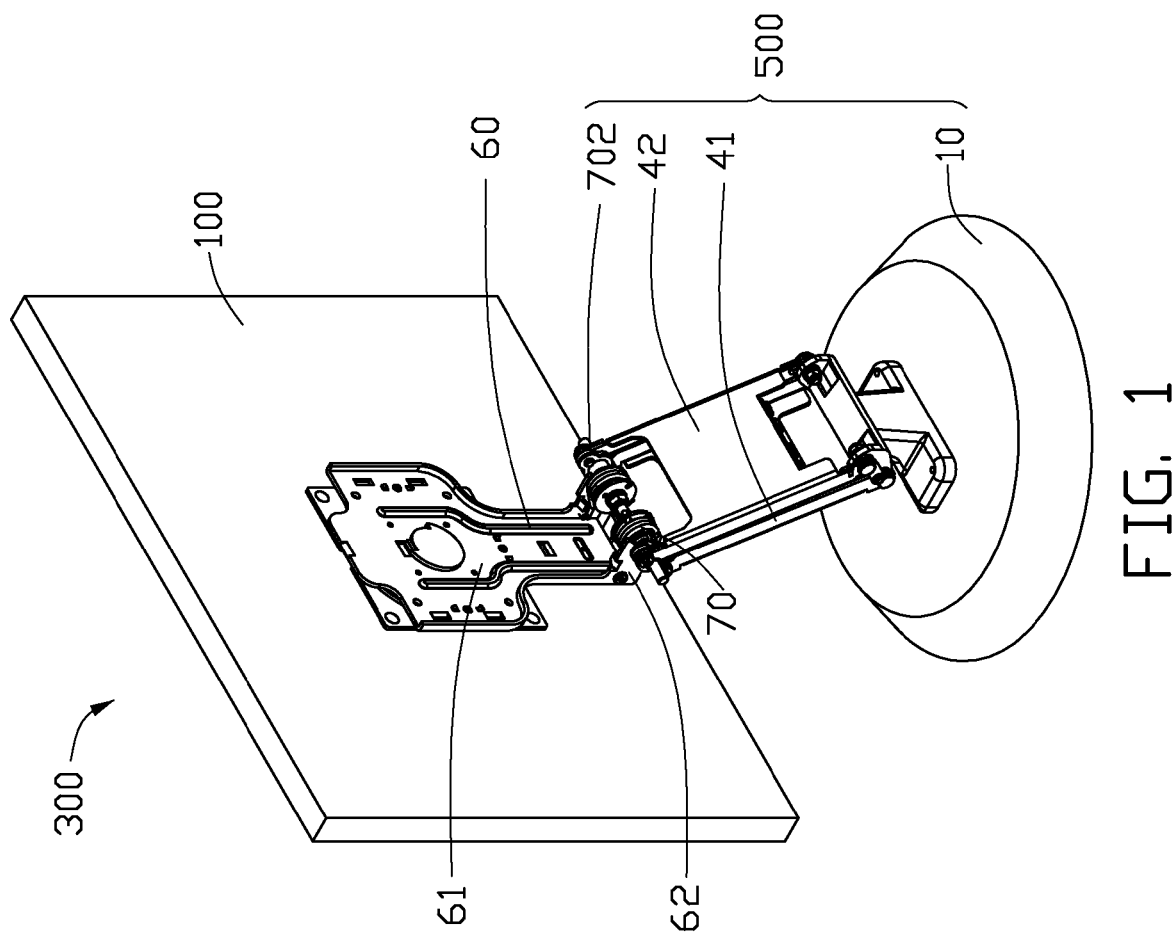
FIG. 1 is an isometric view of an embodiment of a supporting mechanism, the supporting mechanism including a rotatable module, a rotating washer, and a stationary washer.

Referring to FIG. 1, an embodiment of a supporting mechanism 300 includes a connecting member 60, a supporting module 500, and two rotatable modules 70 rotatably connecting the supporting module 500 to the connecting member 60 and the LCD 100. For exemplary purposes, the supporting mechanism 300 is illustrated as supporting a liquid crystal display (LCD) 100 connected to the connecting member 60.

Figure 2:
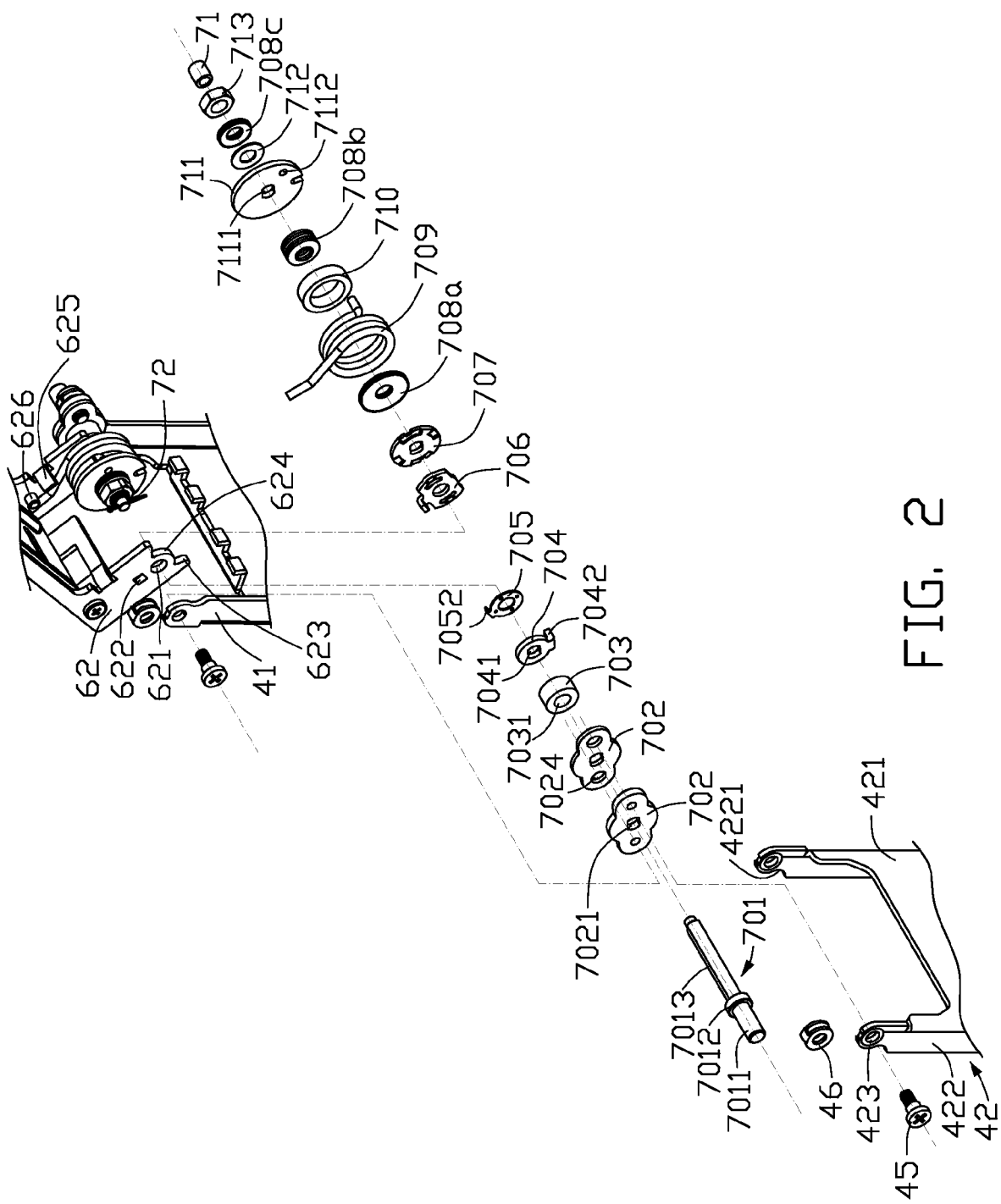
FIG. 2 is a partial, exploded view of the supporting mechanism in FIG. 1.

Referring also to FIG. 2, the connecting member 60 includes a mounting portion 61 and two connecting portions 62 substantially perpendicular to mounting portion 61. The connecting portions 62 are opposite to each other. The mounting portion 61 mounts to the LCD 100. Each connecting portion 62 defines a substantially cylindrical through hole 621 and a substantially rectangular hole 622 adjacent to the through hole 621. Each connecting portion 62 forms two stop portions 623 away from the mounting portion 61, and has a curved surface 624 between the stopping portions 623. In addition, a periphery of each connecting portion 62 forms a blocking plate 625. Two screws (not labeled) may be passed through the two connecting portions 62 to form two stopping portions 626. In another embodiment, each stopping portion 626 may be integrally formed with the corresponding connecting portion 62.

The supporting module 500 includes a base 10, a first link bracket 41, a second link bracket 42, four supporting blocks 702, and four strengthening members 702a corresponding to the four supporting blocks 702. A first end of the first link bracket 41 and a first end of the second link bracket 42 are rotatably connected to the base 10 by two supporting blocks 702, and a second end of the first link bracket 41 and a second end of the second link bracket 42 are connected by the other two supporting blocks 702. The rotatable modules 70 rotatably connect the first link bracket 41 and the second link bracket 42 to the connecting member 60.

Figure 3:
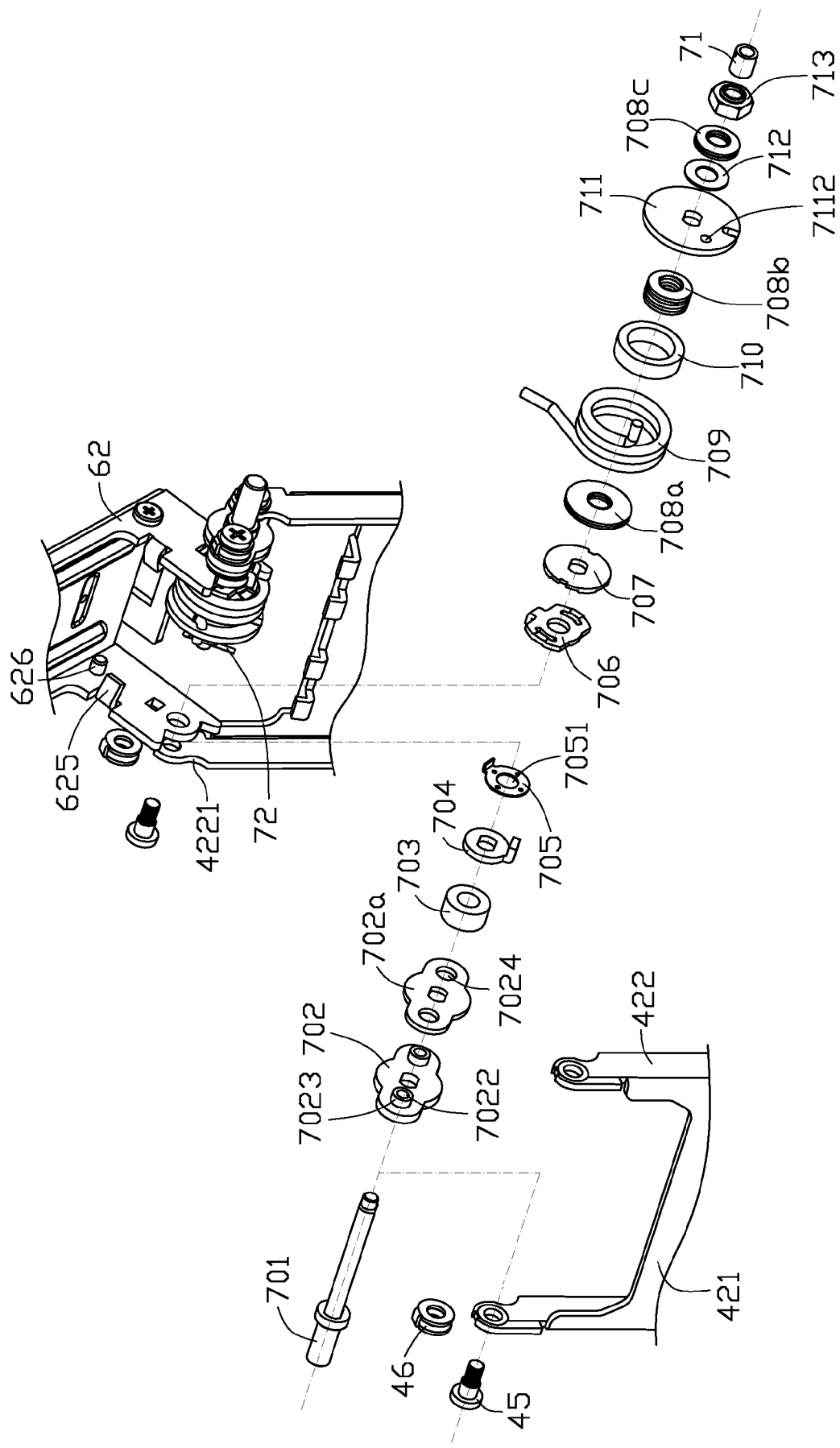
FIG. 3 is similar to FIG. 2, but shown from another aspect.

Referring also to FIG. 3, the first link bracket 41 and the second link bracket 42 have a similar configuration. The second link bracket 42 is substantially an H-shaped bracket. The second link bracket 42 includes a flat portion 421 and four fixing portions 422 substantially perpendicular to the flat portion 421. Each fixing portion 422 defines a through hole 423 adjacent to an end of the fixing portion 422 and forms a curved surface 4221 adjacent to the through hole 423 and the fixing portion 422.

Each supporting block 702 defines a deformed through hole 7021 in a middle portion of the support block 702 and two pivot holes 7022 adjacent to the through hole 7021. A periphery of each pivot hole 7022 forms a substantially cylindrical sleeve portion 7023.

The strengthening members 702a are similar to the supporting blocks 702 except that each strengthening member 702a defines two through holes 7024 corresponding to the sleeve protrusions 7023 of each supporting block 702. The sleeve protrusions 7023 may be received in the through holes 7024, to enhance a mechanical strength of the supporting blocks 702.

Each of the two rotatable modules 70 includes a pivotal shaft 701, a resisting sleeve 703, a limiting washer 704, a frictional washer 705, a rotating washer 706, a stationary washer 707, three resilient members 708a, 708b, 708c, a torsion spring 709, a ring 710, a resisting member 711, a washer 712, and a fixing member 713.

The pivotal shaft 701 includes a flange 7012, a holding portion 7011, and a shaft portion 7013. The holding portion 7011 and the shaft portion 7013 are on opposite sides of the flange 7012. The shaft portion 7013 defines a thread (not shown) on a distal end portion opposite to the flange 7012. A cross-section of the shaft portion 7013 may be non-circular. In the illustrated embodiment, the shaft portion 7013 is flattened along a section of a cylindrical surface area thereof, thereby forming a deformed shaft portion.

The resisting sleeve 703 defines a substantially cylindrical through hole 7031 so that the resisting sleeve 703 is rotatably sleeved on the pivotal shaft 701.

The limiting washer 704 defines a deformed through hole 7041 so that the limiting washer 704 is non-rotatably sleeved on the pivotal shaft 701. In addition, a periphery of the limiting washer 704 forms a limiting tab 7042.

The frictional washer 705 defines a substantially cylindrical through hole 7051 such that the frictional washer 705 is rotatably sleeved on the pivotal shaft 701. A surface of the frictional washer 705 may define a plurality of oil holes (not labeled). A periphery of the frictional washer 705 forms a tab 7052. An extending direction of the tab 7052 is substantially parallel to an extending direction of the through hole 7051. The tab 7052 may be inserted into the rectangular hole 622 of one connecting portion 62 so that the frictional washer 705 is non-rotatable relative to the connecting member 60.

Figure 4:
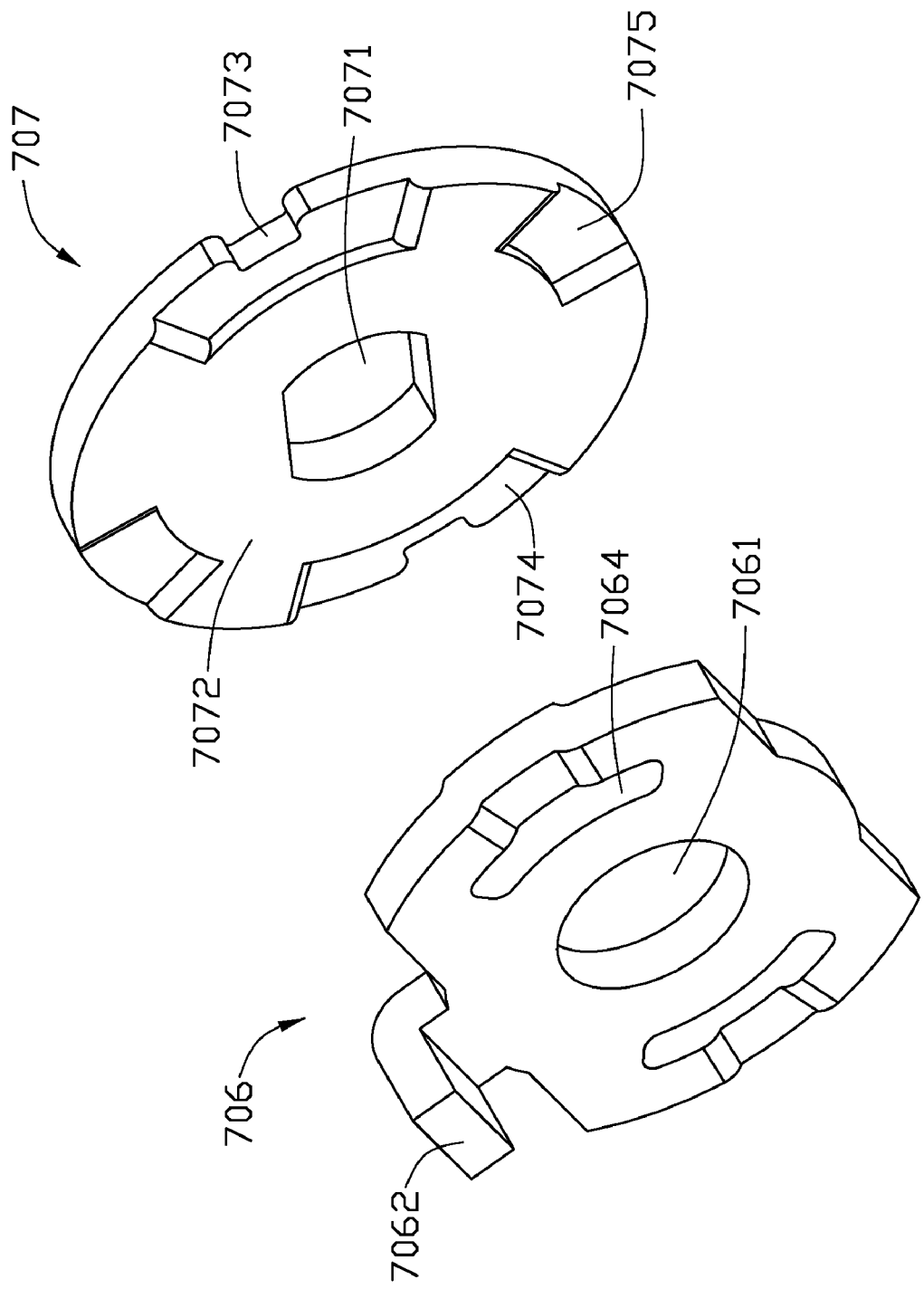
FIG. 4 is an isometric view of the rotating washer and the stationary washer of the supporting mechanism in FIG. 2.
Figure 5:
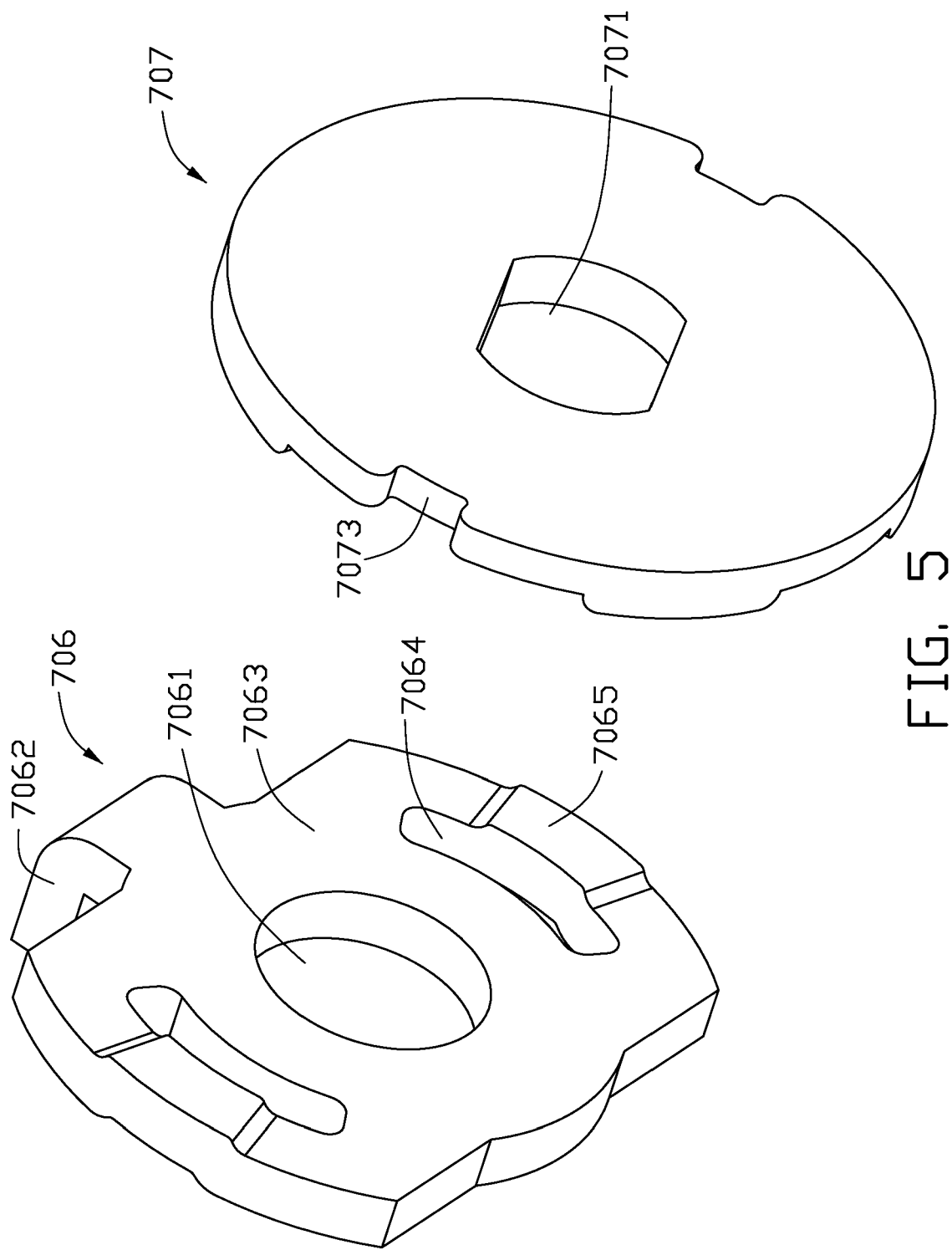
FIG. 5 is similar to FIG. 4, but shown from another aspect.

Also referring to FIGS. 4 and 5, the rotating washer 706 defines a substantially cylindrical shaft hole 7061 in a middle portion such that the rotating washer 706 is rotatably sleeved on the pivotal shaft 701. The rotating washer 706 includes an engaging surface 7063. A periphery of the rotating washer 706 bends and forms a positioning tab 7062. The positioning tab 7062 engages in the rectangular hole 622 of one connecting portion 62 so that the connecting member 60 drives the rotating washer 706 to rotate. The rotating washer 706 further defines two through holes 7064 adjacent to the shaft hole 7061. The two through holes 7064 are symmetrical relative to the shaft hole 7061. In addition, a boundary portion between the periphery of the rotating washer 706 and one through hole 7064 forms a protrusion 7065 on the engaging surface 7063.

In a process of forming the protrusion 7065, each of the two through holes 7064 prevents portions adjacent to the protrusion 7065 of the rotating washer 706 from deforming.

The stationary washer 707 defines a deformed shaft hole 7071 in a middle portion so that the stationary washer 707 is non-rotatably sleeved on the pivotal shaft 701. The stationary washer 707 includes a resisting surface 7072. The stationary washer 707 defines two buffering cut-outs 7073 and two grooves 7074 adjacent to the two buffering cut-outs 7073 in the resisting surface 7072. The two grooves 7074 are symmetrical relative to the deformed shaft hole 7071 and may be formed on the resisting surface 7072 by a punching process. When one of the grooves 7074 is formed, metallic material flows to one corresponding buffering cut-out 7073. In other words, the buffering cut-outs 7073 receive metallic material flowing from the grooves 7074 during the punching process. A depth of the grooves 7074 is about 0.3 millimeters to about 1.0 millimeter.

In the illustrated embodiment, the stationary washer 707 further defines two grooves 7075 that are symmetrical relative to the deformed shaft hole 7071. A depth of the grooves 7075 is about 0.3 millimeters to about 1.0 millimeter. When a thickness of the grooves 7075 is about 0.3 millimeters to about 0.5 millimeters, the grooves 7075 may be formed by controlling a clearance of the punching mold parts, without forming a buffering cut-out before forming the grooves 7075. If a thickness of the grooves 7075 is larger than about 0.5 millimeters, buffering cut-outs may need to be formed before the grooves 7075 are formed by the punching process. The grooves 7074, 7075 engage with the protrusions 7065 of the rotating washer 706 so that the rotating washer 706 and the stationary washer 707 may be maintained in a plurality of relatively stable positions.

It may be understood that the buffering cut-outs 7073 may be replaced by other buffering portions such as buffering holes to receive material flowing from other portions.

The resisting member 711 may be substantially disk-shaped. The resisting member 711 defines a deformed through hole 7111 in a middle portion so that the resisting member 711 is non-rotatably sleeved on the pivotal shaft 701, and a through hole 7112.

To assemble the supporting module 500, a first end of the first link bracket 41 and the second link bracket 42 are rotatably connected to the base 10 by two supporting blocks 702, and a second end of the first link bracket 41 and the second link bracket 42 are connected by another two supporting blocks 702.

The two cylindrical sleeve protrusions 7023 of one supporting block 702 are inserted into the two through holes 7024 of one of the strengthening members 702a.

Two supporting blocks 702 are fixed on the base 10 in such a manner that the two pivot holes 7022 of one supporting block 702 are aligned with the two pivot holes 7022 of the other supporting block 702. A first screw 45 is passed through one through hole 423, in the first end of the first link bracket 41 and one pivot hole 7022 of one supporting block 702. A second screw 45 is passed through one through hole 423, in the first end of the second link bracket 42 and another pivot hole 7022 of the one supporting block 702. Thus, a first side of the first end of the first link bracket 41 and the second link bracket 42 are adjustably rotatable on the base 10. A first end of the first link bracket 41 is rotatably positioned on the base 10. A second side of the first end of the first link bracket 41 and the second link bracket 42 are rotatably positioned on the base 10 in a similar method. A second end of the first link bracket 42 and the second link bracket 42 are rotatably connected by two supporting blocks 702. As a result, the first link bracket 41, the second link bracket 42, and supporting blocks 702 are connected to each other.

One of the two rotatable modules 70 is assembled by passing the shaft portion 7013 is through the deformed through hole 7021 of the supporting block 702, the resisting sleeve 703, the limiting washer 704, the frictional washer 705, the connecting member 60, the rotating washer 706, the stationary washer 707, the resilient member 708a, the resilient member 708b, the ring 710, the torsion spring 709, the resisting member 711, the washer 712, and the resilient members 708c, in that order. Finally, the fixing member 713 is fixed on the shaft portion 7013 to prevent the above mentioned components from detaching.

The limiting tab 7042 resists the curved surface 624 and the ring 710 is sleeved on the resilient members 708a, 708b. The torsion spring 709 is sleeved on the ring 710 so that one end of the torsion spring 709 is inserted into the through hole 7112 of the resisting member 711 and the other end of the torsion spring 709 resists the blocking plate 625 and the protrusion 626 of the connecting member 60. As a result, the LCD 100 is fixed on the connecting member 60. The rotating washer 706 is rotatably sleeved on the shaft portion 7013 and fixed on the connecting member 60. The stationary washer 707 is non-rotatably sleeved on the shaft portion 7013 of the pivotal shaft 701. The pivotal shaft 701 is non-rotatably positioned on one supporting block 42. The resilient members 708 provides an axial force so that the engaging surface 7063 resists the resisting surface 7072 tightly.

In use, an external force may be applied on the LCD 100, thereby pushing the connecting member 60 driving the rotating washer 706 to rotate.

After the rotating washer 706 has rotated to a first angle, the protrusions 7065 of the rotating washer 706 are inserted into the grooves 7074 of the stationary washer 707 so that the rotating washer 706 and the stationary washer 707 can be maintained in a first stable position.

After the rotating washer 706 has rotated to a second angle, the protrusions 7065 of the rotating washer 706 are inserted into the grooves 7075 of the stationary washer 707 so that the rotating washer 706 and the stationary washer 707 can be maintained in a second stable position.

After the connecting member 60 has rotated the second angle, the stopping portion 623 of the connecting member 60 resists the limiting tab 7042 of the limiting washer 704, thereby limiting a rotating angle that the LCD 100 rotates.

A strengthening sleeve 71 may be used to connect two shafts 701 of the two rotatable modules 70 so that the two rotatable modules 70 are substantially coaxial, and a mechanical strength of the two rotatable modules 70 are enhanced.

It may be appreciated that the two supporting blocks 702 connecting the first link bracket 41 and the second link bracket 42 may be omitted. In addition, the protrusions 7065 may be formed on the resisting surface 7072 of the stationary washer 707, the grooves 7074, 7075 and the buffering cut-out 7073 may be defined in the engaging surface 7063 of the rotating washer 706.

It may also be appreciated that, one of the two rotatable modules 70 may be omitted. The strengthening members 702a may also be omitted. Lastly, the supporting module 500 may have other configurations or replaced by a supporting frame.

Finally, while various embodiments have been described and illustrated, the embodiments are not to be construed as being limited thereto. Various modifications can be made to the embodiments by those skilled in the art without departing from the true spirit and scope of the present disclosure as defined by the appended claims.

What is claimed is:

1. A supporting mechanism, comprising:
    a supporting module and two rotatable modules rotatably positioned on the supporting module, each rotatable module comprising:
        a pivotal shaft;
        a rotating washer rotatably sleeved on the pivotal shaft, and having an engaging surface, the engaging surface forming a plurality of protrusions;
        a stationary washer non-rotatably sleeved on the pivotal shaft, and having a resisting surface facing the engaging surface, the resisting surface defining a plurality of grooves engaging with the protrusions and a plurality of buffering portions adjacent to or in the grooves to receive material flowing from other portions adjacent to the grooves;
        a resilient member rotatably sleeved on the pivotal shaft and configured to push the rotating washer to resist the stationary washer; and
        a fixing member preventing the rotating washer, the stationary washer, and the resilient member from detaching from the pivotal shaft;
    wherein the supporting module comprises a base, a first link bracket, a second link bracket, and two supporting blocks; one end of the first link bracket and the second link bracket are rotatably connected with the base, and the other end of the first link bracket and the second link bracket are connected by the supporting blocks; the shaft is non-rotatably positioned on the supporting blocks;
    wherein the pivotal shaft comprises a flange, a holding portion, and a shaft portion, the holding portion and the shaft portion are on opposite sides of the flange; each supporting block defines a deformed through hole corresponding to the shaft portion and two pivot holes adjacent to the through hole, the shaft portion is passed through the deformed through hole of one supporting block, a first screw is passed through the through hole of the first link bracket and one of the two pivot holes of one of the two supporting blocks, a second screw is passed through the through hole of the second link bracket and the other one of the two pivot holes of the one of the two supporting blocks, so that the first link bracket and the second link bracket are connected by one of the two supporting blocks.

2. The supporting mechanism as claimed in claim 1, wherein the buffering portions are buffering holes or buffering cut-outs.

3. The supporting mechanism as claimed in claim 1, wherein both the rotating washer and the stationary washer define a shaft hole; the protrusions are formed on a periphery of the stationary washer or the rotating washer by a punching process; a through hole is defined between the protrusions and the shaft hole.

4. The supporting mechanism as claimed in claim 1, wherein a depth of the grooves is about 0.3 millimeters to about 1.0 millimeter.

5. The supporting mechanism as claimed in claim 1, wherein the supporting module further comprises two strengthening members; a periphery of each of the two holes of the supporting block forms a substantially cylindrical sleeve protrusion; each of the strengthening members defines two through holes corresponding to the two sleeve protrusions; the sleeve protrusions of the supporting blocks are inserted into the through holes of the strengthening members.

6. The supporting mechanism as claimed in claim 1, further comprising a connecting member, a resisting member, a ring, and a torsion spring; the connecting member comprises a mounting portion and two connecting portions substantially perpendicular to the mounting portion, wherein each connecting portion defines a substantially cylindrical through hole; the pivotal shaft is passed through the substantially cylindrical through hole; the resisting member is non-rotatably sleeved on the pivotal shaft, and defines a through hole; the ring is sleeved on the rotating washer and the stationary washer, and the torsion spring is sleeved on the ring; a first end of the torsion spring resists the blocking plate of the connecting member and the stopping portion, and a second end of the torsion spring is inserted into the through hole of the resisting member.

7. The supporting mechanism as claimed in claim 6, further comprising a limiting washer; the limiting washer forms a limiting tab; the limiting washer is non-rotatably sleeved on the pivotal shaft; each connecting portion further forms two stopping portions away from the mounting portion and defines a curved surface between the stopping portions; the limiting washer is adjacent to the connecting member; the limiting tab resists the curved surface.

8. The supporting mechanism as claimed in claim 7, further comprising a frictional washer positioned between the limiting washer and the connecting member, fixed on the connecting member, and rotatable relative to the pivotal shaft.

9. The supporting mechanism as claimed in claim 8, wherein the frictional washer defines a plurality of oil holes.

10. The supporting mechanism as claimed in claim 1, further comprising a strengthening sleeve for connecting two shafts of the two rotatable modules.

* * * * *